United States Patent

Adamko et al.

[11] Patent Number: 5,817,386
[45] Date of Patent: Oct. 6, 1998

[54] SILICONE-FREE RELEASE FILMS

[75] Inventors: Michael A. Adamko, Morristown; Michael Friedman, Wayne, both of N.J.; Dean Waldenberger, Lake George, N.Y.

[73] Assignee: Norton Performance Plastics Corporation, Wayne, N.J.

[21] Appl. No.: 623,208

[22] Filed: Mar. 28, 1996

[51] Int. Cl.[6] .................................................. B32B 7/06
[52] U.S. Cl. .......................................... 428/41.3; 428/523
[58] Field of Search .................... 428/41.3, 41.8, 428/906, 523; 427/208.4

[56] References Cited

U.S. PATENT DOCUMENTS

| | | | |
|---|---|---|---|
| 4,222,973 | 9/1980 | Kasper et al. | 264/22 |
| 4,339,485 | 7/1982 | Shibano et al. | 428/40 |
| 4,425,176 | 1/1984 | Shibano et al. | 156/244.11 |
| 4,759,816 | 7/1988 | Kasper et al. | 428/41.3 |
| 5,026,594 | 6/1991 | Akao | 428/220 |
| 5,080,979 | 1/1992 | Shigemoto et al. | 428/520 |
| 5,380,572 | 1/1995 | Kotani et al. | 428/40 |
| 5,387,620 | 2/1995 | Park et al. | 521/143 |
| 5,393,608 | 2/1995 | Chao | 428/352 |
| 5,451,440 | 9/1995 | Tynan, Jr. | 428/40 |
| 5,455,092 | 10/1995 | Tung | 428/40 |
| 5,500,265 | 3/1996 | Ambrooise et al. | 428/41 |

FOREIGN PATENT DOCUMENTS

| | | | |
|---|---|---|---|
| 308216 A1 | 3/1989 | European Pat. Off. | C09J 7/02 |
| 622411 A2 | 11/1994 | European Pat. Off. | C08L 23/20 |
| 634443 | 1/1995 | European Pat. Off. | C08J 5/18 |
| 85-245549 | 12/1985 | Japan | B32B 7/06 |
| 61-103976 | 5/1986 | Japan | 428/41.3 |
| 94-99551 | 4/1991 | Japan | B32B 27/00 |
| 93-286096 | 11/1993 | Japan | B32B 27/32 |
| 93-329985 | 12/1993 | Japan | B32B 27/00 |
| 95/00333 | 1/1995 | WIPO | B32B 31/00 |
| 95/10566 | 4/1995 | WIPO | C08L 23/04 |

*Primary Examiner*—Alexander Thomas
*Attorney, Agent, or Firm*—Mary E. Porter

[57] ABSTRACT

A silicone-free release film comprises a linear ethylenic polymer having a density from 0.865 to 0.900 g/cc and an index of polydispersity of less than 5.0 and yields a maximum release force value of 39 g/cm at a film thickness of 0.10 to 0.15 mm in an adhesive peel test. The film is useful in manufacturing rolls and sheets of pressure-sensitive adhesive tape.

8 Claims, 1 Drawing Sheet

SILICONE-FREE RELEASE FILMS

BACKGROUND OF THE INVENTION

The invention relates to silicone-free release films having low force release characteristics which are made of thermoplastic materials, especially substantially linear ethylenic polymers and copolymers. The invention includes pressure-sensitive adhesives in the form of solid and foamed films, sheets, and tapes produced using the release films as release liners. The invention is particularly useful in the production of release films, release liners, non-stick carrier webs utilized as the casting surface for adhesives and foams, and coatings for paper and polymer liners for adhesives.

A release film or release liner is a component of a laminated film construction, e.g., pressure-sensitive adhesive foam film, which functions as a protective carrier for the film during handling and storage of the film prior to use. It is separated from an adhesive film and/or face stock of a laminated film construction prior to the application of the film to a substrate. The many types of release liners and films produced in industry may be categorized according to the peel force required to separate the liner from a pressure-sensitive adhesive coated tape under specified test conditions. The most desirable release films for pressure-sensitive adhesives (e.g., adhesives which are tacky upon mechanical contact, without thermal or chemical activation) have a peel test release force value of less than 39 g/cm (0.22 lbs/inch) in an adhesive industry standard peel test. Release liners and films for less demanding applications, such as thermally or chemically activated adhesives, or facestock for labels or printed materials or surfaces requiring protection during shipping and handling, may have release force values much higher, e.g., 55 g/cm (0.308 lbs/inch) and up to peel values typical for low strength adhesive materials.

Conventional thermoplastic materials typically exhibit higher adhesive release force values than are acceptable for pressure sensitive adhesive release films. For example, medium density polyethylene (MDPE) film known as MRLX from Atlantis Plastics has an average force-to-release in the 71–89 g/cm (0.4–0.5 lb/inch) range. Similar, undesirable, high release force values are disclosed in U.S. Pat. Nos. 4,339,485 and 4,425,176 for low density ethylene/alpha-olefin copolymers and blends of these copolymers with medium density polyethylene used as release liners for pressure sensitive acrylic adhesive articles. High pressure sensitive adhesive release force values are disclosed for a broad range of low density polyethylene and alpha-olefin copolymers in JP-A-94-99551, JP-A-93-329985 and JP-A-93-286096.

A new class of low density polyolefins manufactured utilizing metallocene catalysts ("metallocene polymers") are inherently tacky, blocky and self-adherent materials and would be expected to yield even higher release force values from pressure sensitive adhesives than the conventional polyolefins described above.

Commercially used premium, low force release films for pressure sensitive adhesives presently are fabricated from fluoropolymers or silicone polymers, or by using silicone coatings on support materials such as polyester or paper. See, for example, U.S. Pat. No. 5,380,572, and U.S. Pat. No. 5,451,440. The fluoropolymers, fluoroethylene propylene copolymer (FEP) and polytetrafluoroethylene (PTFE), typically exhibit force-to-release values from pressure-sensitive adhesives in the 14–27 g/cm (0.08–0.15 lb/inch) range, while silicone coated polyester (Mylar) has an average force-to-release value in the 9–18 g/cm (0.05–0.10 lb/inch) range.

These release film materials are effective, but have certain deficiencies. Silicone materials migrate into the adhesive and are carried over into the finished product assembly containing the adhesive where the silicone may reduce the effectiveness of the adhesive, interfere with the application of paint or other coatings and components, or present defects upon storage or use of the final product assembly. The cost of FEP and PTFE is a deterrent to their use as disposable liners in adhesive film production. These fluoropolymers are typically used as release films only in expensive specialty applications requiring very high temperature tolerances.

Other materials suggested for release films are primarily intended for release from non-adhesive surfaces and include, for example, the polymethylpentene materials described in U.S. Pat. No. 5,080,979 for use as a coverlay in the manufacture of printed circuit boards for electronic components. Another example of a non-adhesive surface release material, a carboxylic anhydride cross-linked ethylenic polymer which leaves a clean surface after peeling, is disclosed in JP-A-85-245549.

Copolymers of acrylate esters are suggested in U.S. Pat. No. 5,393,608 for use with pressure sensitive adhesive tape, but no release force values are provided.

It has been discovered that a selected class of linear, low density ethylenic polymers and copolymers characterized by a uniform molecular distribution have excellent low force release film properties and may be used as economical, disposable release liners in adhesive film production without a silicone coating. This class includes certain of the new metallocene polymers known to be tacky, blocky and self-adherent. Thus, the low release force values from pressure sensitive adhesives described herein were entirely unexpected for this class of polymeric materials.

SUMMARY OF THE INVENTION

The invention is a release film having a maximum release force value of 39 g/cm (0.22 lbs/inch) at a film thickness of 0.1 to 0.15 mm (4–6 mils) in an adhesive peel test, the release film comprising a linear ethylenic polymer having a density from 0.865 g/cc to 0.900 g/cc and an index of polydispersity of less than 5.0, wherein the release film is substantially free of silicone.

The linear ethylenic polymer may be a polymer of ethylene or a copolymer of ethylene and at least one comonomer, preferably an alpha-olefin, selected from the group consisting of propylene, butene, pentene, hexene, methylpentene and octene. Blends of these polymers may be used.

The release film may be a monolayer film or may further comprise an even number of polymeric film layers laminated onto a core layer to provide a multi-layer construction having two release surfaces, each surface having a maximum release force value of 39 g/cm (0.22 lbs/inch) at a film thickness of 0.1 to 0.15 (4–6 mils) in an adhesive peel test. The multi-layer construction may comprise at least one polymeric film layer having a tensile modulus at 5% elongation of at least 8.27 MPa (1,200 psi) for mechanical support. This mechanical support layer may comprise at least one high density ethylenic polymer (e.g., having a density greater than about 0.940 g/cc). The mechanical support layer may comprise films of other polymers or combinations of polymers, such as polyamide, polypropylene or polymethylpentene, having a tensile modulus at 5% elongation of at least 8.27 MPa.

The multi-layer release film may consist of outer layers having different maximum release force values to form a differential release film.

The invention also includes pressure-sensitive adhesive tape comprising at least one laminate of a pressure-sensitive adhesive layer and a silicone-free release film liner, the release film liner having a maximum release force value of 39 g/cm (0.22 lbs/inch) at a film thickness of 0.1 to 0.15 (4–6 mils) from the pressure-sensitive adhesive layer, and the release film comprising at least one linear ethylenic polymer having a density from 0.865 g/cc to 0.900 g/cc.

The pressure-sensitive adhesive tape may be in the form of a rolled sheet suitable for conversion into smaller articles. The rolled sheets of tape may be supplied in bulk for use in the assembly of products being manufactured using a layer of the adhesive. The adhesive layer is preferably in the form of a solid or textured sheet or a foam.

DESCRIPTION OF THE PREFERRED EMBODIMENT

Figure 1:
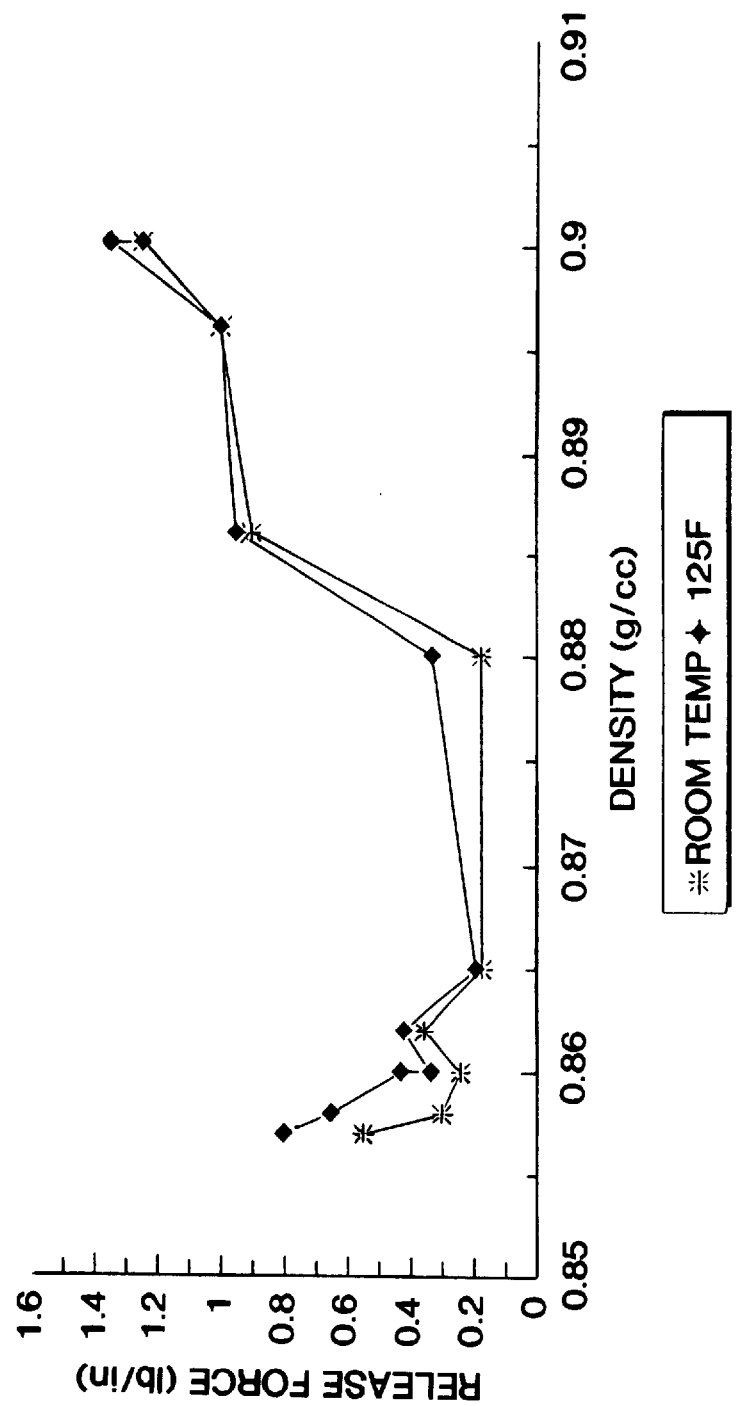
FIG. 1 graphically illustrates the relationship between the density of the polymers used in the release films of the invention and the films release force values for release from a pressure-sensitive adhesive. Details of the test used to generate FIG. 1 are provided in Example 9, below.

Conventional linear ethylenic polymers and/or copolymers have good adhesion to substrates at elevated temperatures as well as to themselves at room and elevated temperatures. For this reason, anti-block agents and slip additives are usually added to the polymers to eliminate difficulties during processing and during the winding and unwinding of film rolls made from these polymeric films. We unexpectedly discovered that in contrast to these characteristics of conventional polymers, certain linear low density ethylenic polymers and/or copolymer films exhibit excellent release properties from pressure sensitive adhesive surfaces, for example, acrylic-based, pressure-sensitive adhesive films.

As used herein, "low density polyethylene" refers to conventional branched polymers of ethylene having a density of about 0.910 to 0.925 g/cc at 25° C. "Medium density polyethylene" and "high density polyethylene" refer, respectively, to linear ethylene homopolymers having densities in the range of about 0.925 to 0.940 g/cc and 0.940 g/cc and greater. "Linear low density polyethylene" refers to the conventional class of substantially linear polymers of ethylene having a density no greater than 0.910 g/cc. Where these density classifications are indicated for "ethylenic polymers" they include homopolymers and copolymers of ethylene with one or more comonomers.

Linear low density ethylenic polymers suitable for use in the release films of the invention (hereinafter "LLDPE") include substantially linear polymers of ethylene, with or without one or more comonomers, having a density from 0.865 to 0.900 g/cc, and a narrow molecular weight distribution. Preferred comonomers for use in the copolymers include α-olefins at a mole percentage of 1 to 10 percent. While the LLDPEs preferred for use in the invention are those polymerized with metallocene catalysts, any LLDPE having the necessary density and molecular weight distribution and yielding acceptable peel test release force values from pressure-sensitive adhesive surfaces may be used.

As used herein, "metallocenes" refers to polymerization catalyst systems such as the system disclosed in U.S. Pat. No. 5,191,052, hereby incorporated by reference. Metallocenes are complex combinations of a metal atom compound with cyclopentadienyl groups (Cp). The metallocenes are a "sandwich complex" arrangement of two Cp groups and a Group IV Transition Metal (Ti, Zr, Hf, Cr). Such catalysts are also named "single site" or "constrained geometry" catalysts. The metallocenes differ significantly in structure and reactivity from the conventional Ziegler-Natta catalysts used in the conventional polymerization of ethylene polymers and copolymers. The metallocenes typically yield a narrow molecular weight distribution, uniform chain lengths, uniform comonomer distribution along the molecular chain and low bulk density in contrast to conventional catalysts for ethylenic polymers.

The metallocene catalyzed polymers are preferred because the metallocene catalysts are single site catalysts and they control the orientation of each monomeric unit added to the polymeric chain. The LLDPE materials produced with these catalysts have a uniform compositional distribution and all polymer molecules within such materials have substantially similar compositions. Some copolymers prepared with metallocene catalysts contain long-chain branches within the ethylene backbone of the molecules. In contrast, conventional linear low density polyethylene typically does not contain long chain branches. Conventional ethylenic polymers have a wide compositional distribution and differ significantly in physical and mechanical properties, such as crystallinity, from metallocene polymers having substantially equivalent molar compositions and average molecular weights. For example, the metallocene catalyzed LLDPE materials useful in the films of the invention are amorphous thermoplastic materials, having a much lower crystallinity than conventional linear low density polyethylene.

Linear ethylenic polymers and/or copolymers with density values greater than 0.900 g/cc do not provide force-to-release values less than or equal to 39 g/cm at a film thickness of 0.1 to 0.15 mm. As density decreases, the force-to-release decreases substantially until the density falls below 0.865 g/cc at which point the force-to-release begins to increase. This is illustrated in FIG. 1.

Films made of substantially linear ethylenic polymers and/or copolymers with density less than 0.865 g/cc are soft and difficult to handle. Therefore, use of such materials as release films also is impractical.

Another notable trend exhibited by the LLDPEs used herein is the decrease in force-to-release values as the polydispersity index decreases, with the strength of this correlation increasing as density decreases. As used herein, the index of polydispersity (IP), is a value equal to the ratio of the weight average molecular weight (Mw) to the number average molecular weight (Mn) (i.e. IP=Mw/Mn).

The LLDPEs preferably have a weight average molecular weight in the range from 50,000 to 200,000, preferably from 75,000 to 200,000, and most preferably from 75,000 to 150,000. The LLDPEs preferably have an index of polydispersity less than 5.0, preferably less than 3.0, and most preferably less than 2.5.

Two or more LLDPEs may be blended together to form the release films Small quantities, e.g., 0.01 to 10.0%, by weight, of other thermoplastic materials may be blended with the LLDPE, provided that the average density of the blend remains in the 0.865 to 0.900 g/cc range, and the film made from the blend has a maximum release force value of 39 g/cm at a film thickness of 0.1 to 0.15 mm. The term "other thermoplastic materials" refers to materials chosen from the following: LDPE, conventional LLDPE, MDPE, HDPE, and other polyolefins and their blends and alloys.

Other conventional film additives, processing aids, pigments and the like may be added to the release film in small quantities, e.g., 0.01 to 5.0%, by weight, provided the density of the LLDPE remains in the 0.865 to 0.900 g/cc range and the release film made with these additives has a maximum release force value of 39 g/cm at a film thickness of 0.1 to 0.15 mm. The film may be cross-linked using techniques known in the art to permit high temperature use.

Films may be produced using various film processing equipment known in the art, including for example, extrusion and compression molding. Where LLDPE blends are used, the blends may be made by combining the polymers in a dry mechanical mixer at room temperature, or in a melt mixing process. In the latter, a dry mechanical premix may be prepared and loaded into a twin screw extruder, heated to a molten stage, extruded into strands and cut into uniform pellets.

In the alternate, blending of polymers and blending of polymers and additives may be achieved in a single screw extruder prior to the film being extruded onto a flat casting extrusion die.

Where the release film is a laminate of three or more layers of polymeric films, a coextruded blown film may be manufactured on equipment known in the art. In a preferred embodiment, a six layer (A1BA2A2BA1) laminated film may be manufactured. The A layer is the LLDPE material suitable for use as an adhesive release surface herein and the B layer is a mechanical support polymer, such as HDPE, or some other extrudable material having required mechanical strength properties to provide structural support for the LLDPE release film. This laminate may be manufactured using a three layer coextrusion die and permitting the bubble of extrudate to collapse on itself to form a single laminated film, having two surfaces with a release force value of less than 39 g/cm at a film thickness of 0.1 to 0.15 mm. Following manufacture, the film is, in effect, a five layer film (A1BA2BA1) because the inner A2A2 layers heat seal and become a single A2 layer.

A similar ABA film laminate may be manufactured using blown film coextrusion or cast film coextrusion equipment known in the art.

The film may be cast or extruded into any desired thickness, length, width or configuration as determined by further adhesive tape or end use manufacturing requirements. In a preferred embodiment, the LLDPE release film is from 0.01 to 0.50 mm (0.5 to 20 mils) in thickness, most preferably 0.05 to 0.15 mm (2 to 6 mils) in thickness for release liners used in the typical manufacture of pressure-sensitive adhesive tape rolls. The selection of the particular thickness depends upon whether a multilayer construction is used, the type of polymers used, whether the film is cast or extruded, and the type of extrusion, and other factors. As with a monolithic release film, multilayer film constructions are preferably 0.01 to 0.50 mm (0.5 to 20 mils), more preferably, 0.05 to 0.15 mm (2 to 6 mils), and most preferably, 0.10 to 0.15 mm (4 to 6 mils) in thickness.

Following the extrusion of a film having the required thickness, the film may be cut to the required size and/or wound upon itself to form a roll of tape in bulk for further handling, e.g., coating with an adhesive composition, solution or foam, or use industrially in the manufacture of other products.

Force-to-release values of the films are determined according to the following procedure used industrially for testing pressure-sensitive-adhesive release liners. Samples of film or liner at a film thickness of 0.1 to 0.15 mm are cut using a standard device for cutting samples to 2.54 cm (1±1/32 inches) in width by 25.4 cm (10 inches) in length representing different parts of an adhesive film roll, i.e., the front, center, and back of each finished roll tested. The sample is applied to a pre-cast sheet (substrate) and placed in an Instron tensile test machine (model No. 1445) capable of operating at 101.6 cm (40 inches) per minute cross-head speed with the recorder set to record on a 2.2 Kg (1 pound) full scale load range. The film being tested is clamped in the top grip of the machine and the pre-cast sheet in the bottom grip. As the cross-head of the machine moves at the preset speed, the film and the substrate are allowed to separate at a natural, uninfluenced angle. Force-to-release readings are taken from the chart recorder, and any spikes in release are marked and any assignable causes such as air pockets are noted. Tests of the release characteristics are performed at room temperature and then repeated after aging the samples at 52° C. (125° F.) for 72 hours. For film samples having a thickness outside of the test specification, the force-to-release values are observed to be proportional to the thickness of the film and are a function, in part, of the modulus of the film which is also proportional to the film thickness. For example, a sample of a film tested at 0.1 mm in thickness which has a force-to release value of 30 g/cm, will have a force-to-release value of about 300 g/cm when the identical film is tested at a sample thickness of 1.0 mm.

The following examples are provided as an illustration, not a limitation, of the invention.

EXAMPLE 1

Control samples of 0.1 mm (0.004 inch) thick medium density polyethylene MRLX film were obtained from Atlantis Plastics. The force-to-release of this film was evaluated according to the procedure detailed above for comparative purposes. Properties of this film appear below in Table 1.

EXAMPLE 2

Control samples of film were manufactured from a conventional, linear low density polyethylene, Petrothene GB502 resin, obtained from Quantum Chemical Corporation, for comparative purposes. The film extrusion line contained a single screw extruder, a flat cast film die, and a roll stack down stream unit to cool and take-up the final film. The extruder screw had a 5.08 cm (2") diameter and a length to diameter ratio (L/D) of 24:1. The compression ratio of the screw was 3.5:1.0. The screw rotated in an extruder barrel of the same length. The rotational screw speed was 7 rpm. The barrel was heated with outside electrical heaters. The temperatures of the barrel sections were maintained in the following ranges:

zone 1 (feeding section) 110°–120° C. (230°–250° F.)
zone 2 (melting section) 145°–155° C. (290°–310° F.)
zone 3 (plasticizing section) 160°–171° C. (320°–340° F.)
zone 4 (metering section) 180°–190° C. (350°–370° F.)

The melt from the extruder was discharged into the flat cast film die 46 cm (18") wide and formed into a flat film web, which was taken, calibrated, and cooled by the two roll casting unit. The temperature of the extrusion die was kept in the range from 190°–210° C. (370° to 410° F.). The temperature of the upper roll was from 77°–88° C. (170° to 190° F.), and the temperature of the bottom roll was from 66°–77° C. (150° to 170° F.). The surface speed of the two casting rolls was 1.5 meters (5 feet) per minute to produce film having a thickness of 0.1 mm (0.004 inch). The cooled film was wound in a roll, and then slit to the required width and length for use and evaluation. The force-to-release value of this film was evaluated according to the procedure detailed above. Properties of this film appear below in Table 1.

EXAMPLE 3

Control samples of a 0.05 mm (0.002 inch) thick polyester film, which had been silicone coated, were obtained from Release International. The force-to-release of this film was evaluated according to the procedure detailed above for comparative. Properties of this film appear below in Table 1.

EXAMPLE 4

Samples of 0.075 mm (0.003 inch) thick film were manufactured from a metallocene catalyzed LLDPE copolymer, Exact™ 3033 plastomer, obtained from Exxon Chemical Company. This polymer has a density of 0.900 g/cc, measured according to ASTM D-792. The film extrusion line used to produce film samples was identical to that described in Example 2 with the following exceptions: the extruder screw had a 2.54 cm (1") diameter, the extruder had 3 barrel zones, and the flat cast film die was 25.4 cm (10 inches) wide. The extruder processing conditions were as follows:

zone 1 (feeding) 154°–165° C. (310°–330° F.)
zone 2 (melting/plasticizing) 193°–204° C. (380°–400° F.)
zone 3 (metering) 232°–243° C. (450°–470° F.)
screw speed 15 rpm
film die temperature 257°–268° C. (495°–515° F.)
upper casting roll temperature 38°–60° C. (100°–140° F.)
lower casting roll temperature 38°–54° C. (100°–130° F.)
casting roll surface speed 0.76 mpm (2.5 fpm).

The force-to-release of this film was evaluated according to the procedure detailed above. Properties of this film appear below in Table 1. In addition to low absolute force-to-release values, the films did not exhibit undesirable spikes of high release force (the so-called "zippy" behavior).

EXAMPLE 5

Samples of film were manufactured from a blend of a metallocene catalyzed LLDPE, Exact™ 3033 plastomer, obtained from Exxon Chemical Company, with another metallocene catalyzed LLDPE, Engage™ KC8852 elastomer available from Dow Chemical Company. The weight ratio of the Exact™ 3033 component to the Engage™ KC8852 component was 9:1. Monolayer film samples were prepared from this blend of materials using the equipment and procedure described in Example 4. The extruder processing conditions used to produce 0.075 mm (0.003 inch) thick film were as follows:

zone 1 (feeding section) 154°–165° C. (310°–330° F.)
zone 2 (melting/plasticizing) 193°–204° C. (380°–400° F.)
zone 3 (metering) 232°–243° C. (450°–470° F.)
screw speed 15.3 rpm
film die temperature 257°–268° C. (495°–515° F.)
upper casting roll temperature 38°–60° C. (100°–140° F.)
lower casting roll temperature 38°–54° C. (100°–130° F.)
casting roll surface speed 0.76 mpm (2.5 fpm)

The force-to-release of this film was evaluated according to the procedure detailed above. Properties of this film appear below in Table 1.

EXAMPLE 6

Film samples were extruded using conventional, industrial scale, blown film technology, from metallocene catalyzed LLDPE copolymers obtained from Exxon under the name, Exact™ plastomer, and the following grade designations: 4011, 4015, 3028, and 3033. Exact™ 4011 ethylene-based plastomer has a density of 0.885 g/cc and is designed for use in blends with polyolefins to improve heat sealing performance and toughness in film applications. Exact™ 4015 ethylene-based butene plastomer has a density of 0.896 g/cc and is designed for use in monolayer and multilayer blown film applications. Exact™ 3028 linear ethylene-based butene copolymer has a density of 0.900 g/cc and is designed for both monolayer and multilayer coextruded blown film applications requiring excellent toughness and outstanding heat sealing performance. Exact™ 3033 linear ethylene-based terpolymer has a density of 0.900 g/cc and is designed for similar applications as Exact™ 3028 copolymer. The force-to-release of these films was evaluated according to the procedure detailed above. Properties of these films appear below in Table 1. The results illustrate the uniformity of low force-to-release values (i.e. no "zippy" behavior) as well as the decrease in force-to-release value with a decrease in density.

EXAMPLE 7

Film samples were extruded using conventional, industrial scale, blown film technology from metallocene catalyzed LLDPEs, Exact™ plastomers obtained from Exxon and having the following grade designations: 4011, 4015, 4041, and 4051. Each film contained an anti-block additive manufactured by A. Schulman Incorporated. The force-to-release of these films was evaluated according to the procedure detailed above. Properties of the films appear below in Table 1.

EXAMPLE 8

Samples of film were manufactured from Flexomer™ Polyolefin DFDB-1085 NT and DFDB-9042 semi-crystalline ethylene copolymers obtained from Union Carbide Chemicals and Plastics Company. These copolymers are not polymerized with a metallocene catalyst, but are examples of LLDPEs suitable for use herein which have been polymerized with conventional catalysts. The DFDB-1085 NT polymer has a density of 0.884 g/cc and is typically used as an impact modifier for Polypropylene and polyethylene, a property enhancer for recycled polyolefins, and as a base resin for various masterbatches. The DFDB-9042 polymer has a density of 0.900 g/cc and is typically used as an impact modifier, a carrier for masterbatches and color concentrates, and as a processing aid.

Monolayer film samples were prepared from each polymer using the equipment and procedures described in Example 4. The extruder processing conditions used to produce 0.1 mm (0.004 inch) thick films were as follows:

zone 1 (feeding) 127°–143° C. (260°–290° F.)
zone 2 (melting/plasticizing) 143°–160° C. (290°–320° F.)
zone 3 (metering section) 143°–160° C. (290°–320° F.)
screw speed 20–25 rpm
film die temperature 138°–160° C. (280°–320° F.)
upper casting roll temperature 38°–60° C. (100°–140° F.)
lower casting roll temperature 38°–60° C. (100°–140° F.)
casting roll surface speed 1.2–1.8 mpm (4–6 fpm).

The force-to-release of these films was evaluated according to the procedure detailed above. Properties of these films appear below in Table 1.

EXAMPLE 9

A series of films were made by compression molding as described below from a group of experimental and commercial copolymers having a density range from 0.857 to 0.880 g/cc, as measured by ASTM D-792 method, and from some of the copolymers described in Examples 6, 7 and 8.

Using a compression molding technique, monolayer film samples at a thickness of about 1.0 to 1.5 mm (50±10 mils) were produced by pressing resin pellets on a hydraulic Carver Laboratory Press. (Film thicknesses of 0.01 to 0.5 mm could not be achieved in the laboratory scale compression molding apparatus.) The press has a 25 ton load capacity and 22.9 cm (9 inch) by 22.9 cm (9 inch) electrically heated and water cooled platens. Film samples were produced by placing a 0.075 mm (0.003 inch) thick PTFE release sheet on top of a 22.9 cm (9 inch) by 22.9 cm (9 inch) steel caul plate having a thickness of 2.29 mm (0.090 inch). A steel ring mold having a 16.5 cm (6.5 inch) inner diameter and a height of 1.91 mm (0.075 inch) was placed on top of the PTFE release sheet. Resin pellets were then placed within the ring mold, a second PTFE release sheet was placed on top of the resin and mold, and a second steel caul plate was placed on top of the second PTFE sheet. Both platens of the Carver press were heated to 180° C. (360° F.). The mold assembly was placed into the press and the heated platens were brought together until contact was made with the top and bottom caul plates. Without applying pressure to the resin, the mold assembly was held in the press for 5 minutes to melt the resin pellets. The platens were then slowly closed to apply pressure to the mold assembly, thereby forcing the molten polymer to fill the ring mold without air entrapment. The mold assembly was held under pressure for 10 minutes. The platen heaters were then turned off and the platen cooling water was turned on until the press and mold assembly returned to room temperature. The press was then opened, and the film sample disk was removed from the mold assembly.

Release force values were measured by the procedure described above, except that the sample film thickness was about 10 times higher than the specified test thickness of 0.1 to 0.15 mm. Therefore, force-to-release values are about 10 times higher than values for the same films using a sample thickness of 0.1 to 0.15 mm (i.e., samples and values reported for Examples 6, 7 and 8, above, using thinner, extruded samples of the same films). Results are shown in FIG. 1 and Table 1.

EXAMPLE 10

Three layer coextruded blown film samples of the ABA type were produced using a metallocene catalyzed LLDPE, EXACT™ 4011 plastomer, obtained from Exxon Chemical Company, as the skin layers (A) surrounding a high density polyethylene (HDPE) core layer (B). This configuration was designed to combine the advantages of the low force-to-release property of LLDPE with the high stiffness and modulus of HDPE. This multilayer configuration also illustrates a differential release liner, with a force-to-release that differs from one surface of the film to the other, as a result of using different types of LLDPE as the skin layers.

The skin layers were produced using two 8.89 cm (3.5") diameter extruders. The core layer was produced using a 6.35 cm (2.5") diameter extruder. The three extruders fed a coextrusion feed block which in turn fed a 40.6 cm (16") diameter blown film die. The blow up ratio was approximately 2.4 to 1 to yield a film layflat width of approximately 152 cm (60") and a trimmed film width of 147 cm (58").

Two film samples, both having 0.1 mm (0.004 inch) total thickness, were produced using different ratios of skin layer to core layer thickness and different additive packages in the skin layers. The first sample was comprised of 0.025 mm (0.001 inch) thick skin layers and a 0.05 mm (0.002 inch) thick core layer.

Both skin layers contained a 5% loading level of Polybatch® FSU-303-JD2 slip and antiblock concentrate, obtained from A. Schulman Incorporated. This additive concentrate is composed of 30% natural silica and 3% erucamide in a carrier of Exxon Exact™ 4028 resin and is produced using industrial equipment known in the art. The second sample was comprised of 0.0125 mm (0.0005 inch) thick skin layers and a 0.076 mm (0.003 inch) thick core layer. Both skin layers for this sample contained a 10% loading level of Polybatch® 505, a commercially available slip and antiblock concentrate obtained from A. Schulman Incorporated. The force-to-release of the films described above was evaluated according to the procedure detailed above. Properties of these films appear below in Table 1.

EXAMPLE 11

A six layer film construction (of the type $A_1BA_2A_2BA_1$) was produced using a three layer coextrusion blown film equipment configuration by allowing the extruded bubble to collapse and heat seal to itself at the nip of the collapsing tower. Layers $A_1$ and $A_2$ were composed of a metallocene catalyzed LLDPE copolymer, Exact™ 4011 plastomer, obtained from Exxon Chemical Company. Layer B was composed of high density polyethylene having a density of 0.960 g/cc. This configuration was designed to combine the advantages of the low force-to-release property of substantially linear ethylenic polymers and/or copolymers with the high stiffness and modulus of HDPE. The skin layers $A_1$ contained the following additives: 10% loading level of Polybatch EXT 2017S, an antiblock concentrate, obtained from A. Schulman Incorporated; 5% loading level of Polybatch EXT 209, a slip concentrate obtained from A. Schulman Incorporated; and 1% loading level of Polybatch EXT 206F, a processing aid concentrate, obtained from A. Schulman Incorporated. The Polybatch EXT 2017S antiblock concentrate is composed of 20% natural silica in a carrier of Exxon Exact™ 4011 resin and is produced using industrial equipment known in the art. The Polybatch EXT 209 slip concentrate is composed of 5% oleamide in a metallocene catalyzed polyethylene resin carrier and is produced using industrial equipment known in the art. The Polybatch EXT 206F processing aid concentrate is composed of 3% processing aid in a metallocene catalyzed polyethylene resin carrier and is produced using industrial equipment known in the art. The skin layers $A_1$ were produced using a 60 mm (2.36 inch) diameter extruder while the inner layers $A_2$ were produced using a second 60 mm (2.36 inch) diameter extruder. The HDPE layers (B) were produced using a 3.5 inch (88.9 mm) diameter extruder. The three extruders fed a coextrusion feed block which in turn fed a 40.6 cm (16 inch) diameter blown film die. The blow up ratio was approximately 2.4 to 1 to yield a film layflat width of approximately 152.4 cm (60 inches) and a trimmed film width of 147.3 cm (58 inches). The overall film thickness of the samples produced was 0.127 mm (0.005 inches) with the individual layer thickness as follows: $A_1=A_2=0.0127$ mm (0.0005 inches), and B=0.038 mm (0.0015 inches). The force to release of the film described above was evaluated according to the procedure detailed above. Properties of this film appear below in Table 1.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

TABLE 1

| | Polymer Properties | | | |
|---|---|---|---|---|
| | Density | | Avg. Force-to-Release g/cm (lb/in) | |
| Example # | (g/cc) | I.P. | initial | after aging |
| 1(comparative) | 0.950 | 6—7 | 80(0.45) | 107(0.60) |
| 2(comparative) | 0.919 | 5—8 | 77(0.43) | 60(0.338) |
| 3(comparative) | 1.4 | — | 9–18(0.05–0.10) | 9–18(0.05–0.10) |
| 4 | 0.900 | 2.1 | 32(0.18) | 54(0.30) |
| 5 | 0.897 | 2.1 | 41(0.23) | 54(0.30) |
| 6 | | | | |
| Exact ™ 4011 | 0.888 | 2.1 | 12.5(0.07) | 21.4(0.12) |
| Exact ™ 4015 | 0.896 | 2.1 | 25.0(0.14) | 25.0(0.14) |
| Exact ™ 3028 | 0.900 | 2.1 | 39.3(0.22) | 41.1(0.23) |
| Exact ™ 3033 | 0.900 | 2.1 | 41.1(0.23) | 46.5(0.26) |
| 7 | | | | |
| Exact ™ 4011 | 0.888 | 2.1 | 9.5(0.053) | 12.5(0.070) |
| Exact ™ 4015 | 0.896 | 2.1 | 15.4(0.086) | 17.7(0.099) |
| Exact ™ 4041 | 0.878 | 2.1 | 6.8(0.038) | 8.0(0.045) |
| Exact ™ 4051 | 0.895 | 2.1 | 22.7(0.127) | 26.4(0.148) |
| 8 | | | | |
| DFDB-1085-NT | 0.884 | 4.09 | 19.7(0.110) | 25.9(0.145) |
| DFDB-9042 | 0.900 | 3.7 | 35.7(0.200) | 51.8(0.290) |
| 9 | | | | |
| Exp-1 | 0.857 | 1.2 | 98.3(0.550) | 143(0.800) |
| Exp-2 | 0.858 | 1.2 | 53.6(0.300) | 116(0.650) |
| Exp-3 | 0.860 | 1.2 | 42.9(0.240) | 76.8(0.430) |
| Exp-4 | 0.860 | 1.4 | 42.9(0.240) | 59.9(0.335) |
| Exp-5 | 0.862 | 1.2 | 63.5(0.355) | 75.1(0.420) |
| Exp-6 | 0.865 | 1.6 | 30.4(0.170) | 34.0(0.190) |
| Exp-7 | 0.880 | 1.04 | 31.3(0.175) | 59.0(0.330) |
| DFDB-1085-NT | 0.886 | 4.9 | 161(0.900) | 170(0.950) |
| Exact ™ 4015 | 0.896 | 2.1 | 179(1.000) | 179(1.0000) |
| DFDB-9042 | 0.900 | 3.7 | 223(1.250) | 241(1.350) |
| Exact ™ 3033 | 0.900 | 2.1 | 223(1.250) | 223(1.250) |
| 10 | | | | |
| +10% slip/antiblock | 0.888 | 2.1 | 23.2(0.130) | 25.9(0.145) |
| +5% slip/antiblock | 0.888 | 2.1 | 24.1(0.135) | 31.3(0.175) |
| 11 | | | | |
| layer A₁ | 0.888 | 2.1 | 27.7(0.155) | 34.5(0.193) |
| layer A₂ | 0.888 | 2.1 | | |
| layer B | 0.888 | — | | |

TABLE 1-continued

| | Polymer Properties | | | |
|---|---|---|---|---|
| | Density | | Avg. Force-to-Release g/cm (lb/in) | |
| Example # | (g/cc) | I.P. | initial | after aging |
| | 0.960 | | | |

We claim:

1. A pressure-sensitive adhesive tape comprising at least one laminate of a pressure-sensitive adhesive and a silicone-free release film liner, the release film liner having a maximum release force value of 39 g/cm (0.22 lbs/in) from the pressure-sensitive adhesive at a release film liner thickness of 0.10 to 0.15 mm, and comprising at least one linear ethylenic polymer having a density from 0.865 g/cc to less than 0.900 g/cc.

2. The pressure-sensitive adhesive tape of claim 1, wherein the tape is in the form of a rolled sheet.

3. The pressure-sensitive adhesive tape of claim 1, wherein the silicone-free release film liner further comprises a multi-layer construction having an odd number of layers of polymeric film and having two release surfaces, each release surface having a maximum release force value of 39 g/cm (0.22 lbs/inch) at a release film liner thickness of 0.10 to 0.15 mm from the pressure-sensitive adhesive.

4. The pressure-sensitive adhesive tape of claim 3, wherein the multi-layer construction comprises a core layer of at least one polymeric film having a tensile modulus at 5% elongation of at least 8.27 MPa (1,200 psi) for mechanical support, and the core layer is laminated directly to the silicone-free release film liner.

5. The pressure-sensitive adhesive tape of claim 4, wherein the core layer is selected from the group of polymeric films consisting of polyethylene polymers and copolymers having a density greater than 0.940 g/cc, polyamide, polypropylene, polymethylpentene, polyester and combinations thereof.

6. The pressure-sensitive adhesive tape of claim 3, wherein the two release surfaces have different maximum release force values.

7. The pressure-sensitive adhesive tape of claim 1, wherein the silicone-free release film is 0.05 to 0.15 mm (2 to 6 mils) in thickness.

8. The pressure-sensitive adhesive tape of claim 1, wherein the silicone-free release film liner consists of at least once linear ethylenic polymer which has been polymerized using a metallocene catalyst, and wherein the polymer has an index of polydispersity of less than 5.0.

* * * * *